(12) United States Patent
Liebhart et al.

(10) Patent No.: US 10,917,783 B2
(45) Date of Patent: Feb. 9, 2021

(54) MACHINE-TYPE COMMUNICATION PROXY FUNCTION

(75) Inventors: Rainer Liebhart, Munich (DE); Devaki Chandramouli, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 331 days.

(21) Appl. No.: 14/371,881

(22) PCT Filed: Jan. 13, 2012

(86) PCT No.: PCT/US2012/021294
§ 371 (c)(1),
(2), (4) Date: Aug. 28, 2014

(87) PCT Pub. No.: WO2013/105977
PCT Pub. Date: Jul. 18, 2013

(65) Prior Publication Data
US 2015/0208232 A1    Jul. 23, 2015

(51) Int. Cl.
*H04W 8/26* (2009.01)
*H04W 4/70* (2018.01)
*H04L 29/12* (2006.01)

(52) U.S. Cl.
CPC .............. *H04W 8/26* (2013.01); *H04L 61/106* (2013.01); *H04L 61/6013* (2013.01); *H04L 61/6054* (2013.01); *H04W 4/70* (2018.02)

(58) Field of Classification Search
CPC ............... H04L 61/106; H04L 61/6013; H04L 61/6054; H04W 4/06; H04W 4/005; H04W 8/26; H04W 68/02; H04W 76/023; H04W 88/16; H04W 4/70

USPC .............. 370/230, 254, 331, 338; 455/412.1, 455/422.1
See application file for complete search history.

(56) References Cited

U.S. PATENT DOCUMENTS

| | | | |
|---|---|---|---|
| 2003/0050047 A1* | 3/2003 | Ala-Luukko | H04W 8/26 455/412.1 |
| 2005/0192007 A1 | 9/2005 | Kumar et al. | |
| 2007/0105531 A1 | 5/2007 | Schroeder, Jr. | |
| 2008/0317036 A1 | 12/2008 | Chandrasiri et al. | |
| 2012/0302229 A1* | 11/2012 | Ronneke | H04L 61/106 455/422.1 |

(Continued)

FOREIGN PATENT DOCUMENTS

WO    2011/098150 A1    8/2011

OTHER PUBLICATIONS

International Search Report and Written Opinion dated Mar. 28, 2012 issued in corresponding International Application No. PCT/US2012/021294.

(Continued)

*Primary Examiner* — Harun Chowdhury
(74) *Attorney, Agent, or Firm* — Squire Patton Boggs (US) LLP (57) ABSTRACT

One embodiment includes a method and apparatus for routing messages in a machine-type communication (MTC) architecture. The method includes receiving a request at a MTC-proxy residing at an egress of a network. The request includes an international mobile subscriber identity (IMSI) for which a destination is outside the network. The method further includes replacing, by the MTC-proxy, the IMSI in the request with an external identifier.

12 Claims, 5 Drawing Sheets

(56) References Cited

U.S. PATENT DOCUMENTS

2013/0279372 A1* 10/2013 Jain .................... H04W 4/06
370/254

OTHER PUBLICATIONS

3GPP TS 23.401 V11.0.0 (Dec. 2011), 3GPP, Technical Specification Group Services and System Aspects, General Packet Radio Service (GPRS) enhancements for Evolved Universal Terrestrial Radio Access Network (E-UTRAN) access (Release 11).
3GPP TS 23.682 V0.1.0 (Nov. 2011), 3GPP, Technical Specification Group Services and System Aspects, Architecture Enhancements to facilitate communications with Packet Data Networks and Applications (Release 11).
3GPP TR 23.888 V1.6.0 (Nov. 2011), 3GPP, Technical Specification Group Services and System Aspects, System Improvements for Machine-Type Communications, (Release 11) / Feb. 12, 2011.
3GPP TR 23.888 V1.2.0 (Apr. 2011); 3rdGeneration Partnership Project; Technical Specification Group Services and System Aspects; System Improvements for Machine-Type Communications; (Release 11).
TD S2-112896; Huawei, et al.; "Internal Identifier and External Identifier"; 3GPP TSG SA WG2 Meeting #85; May 16-20, 2011, Xi'An, China (e-mail revision 1 of S2-112870).
European Search Report application No. 12865099.1 dated Aug. 7, 2015.
Chinese Office Action issued in corresponding Chinese Patent Application No. 201280066959.4 dated Jun. 19, 2017.
Second Office Action dated Feb. 12, 2018 corresponding to Chinese Patent Application No. 201280066959.4.
European Office Action issued in corresponding European Patent Application No. 12 865 099.1 dated Jan. 7, 2019.
Chinese Office Action issued in corresponding Chinese Patent Application No. 201280066959.4 dated Feb. 28, 2020.

* cited by examiner

MACHINE-TYPE COMMUNICATION PROXY FUNCTION

BACKGROUND

Field

Embodiments of the invention relate to wireless communications networks, such as the Universal Mobile Telecommunications System (UMTS) Terrestrial Radio Access Network (UTRAN) Long Term Evolution (LTE) and Evolved UTRAN (E-UTRAN).

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE improves spectral efficiency in communication networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. In addition, LTE is an all internet protocol (IP) based network, supporting both IPv4 and IPv6.

The Evolved 3GPP Packet Switched Domain, which is also known as the Evolved Packet System (EPS), provides IP connectivity using the E-UTRAN.

SUMMARY

One embodiment includes a method for routing messages in a machine-type communication (MTC) architecture. The method includes receiving a request at a MTC-proxy residing at an egress of a network. The request includes an international mobile subscriber identity (IMSI) for which a destination is outside the network. The method further includes replacing, by the MTC-proxy, the IMSI in the request with an external identifier.

Another embodiment is directed to an apparatus including at least one processor and at least one memory including computer program code. The at least one memory and the computer program code are configured, with the at least one processor, to cause the apparatus at least to receive a request at an egress of a network, where the request includes an international mobile subscriber identity (IMSI) for which a destination is outside the network. The at least one memory and the computer program code are further configured, with the at least one processor, to cause the apparatus to replace the IMSI in the request with an external identifier.

Another embodiment is directed to an apparatus including means for receiving a request at an egress of a network. The request includes an international mobile subscriber identity (IMSI) for which a destination is outside the network. The apparatus further includes means for replacing the IMSI in the request with an external identifier.

Another embodiment includes a computer program embodied on a non-transitory computer readable medium. The computer program is configured to control a processor to perform a process that includes receiving a request comprising an international mobile subscriber identity (IMSI) for which a destination is outside the network, and replacing the IMSI in the request with an external identifier.

BRIEF DESCRIPTION OF THE DRAWINGS

For proper understanding of the invention, reference should be made to the accompanying drawings, wherein.

DETAILED DESCRIPTION

Figure 1:
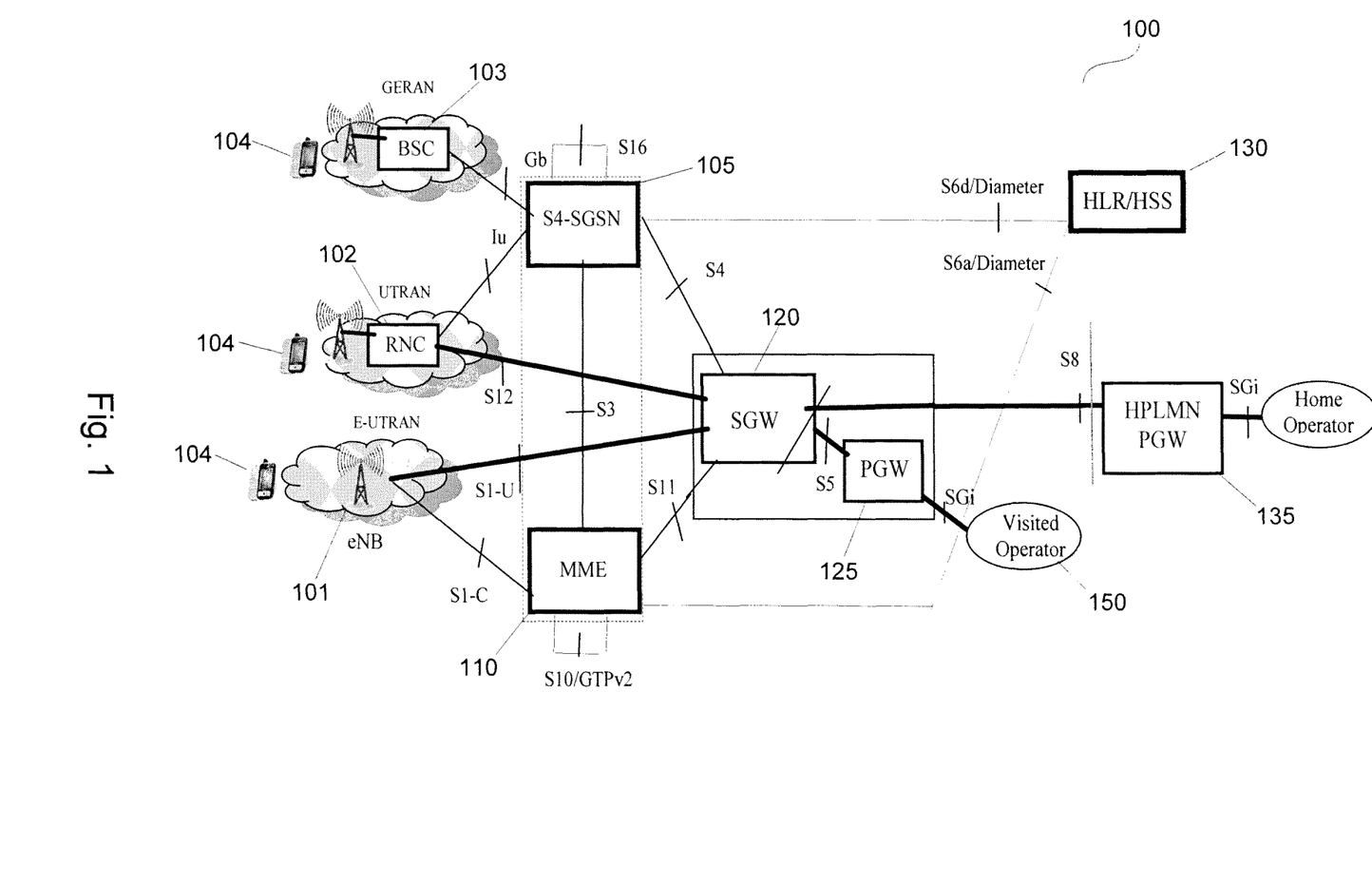
FIG. 1 illustrates a system according to one embodiment of the invention.

The evolved packet system (EPS) is the evolution of the general packet radio system (GPRS). EPS provides a new radio interface and new evolved packet core (EPC) network functions for broadband wireless data access. FIG. 1 illustrates an example of the EPS core network 100, according to an embodiment. As illustrated in FIG. 1, the EPS core network 100 may include the Mobility Management Entity (MME) 110, Packet Data Network Gateway (PGW) 125, and Serving Gateway (SGW) 120. MME 110 may be connected to SGW 120 via the S1 interface, and the SGW 120 in turn may be connected to PGW 125 via the S5 interface.

A common packet domain core network, such as EPS core network 100, can be used to provide core network functionality to the base station controller (BSC) 103 of the GSM/Edge radio access network (GERAN), the radio network controller (RNC) 102 of the UTRAN, and the eNB 101 of the E-UTRAN.

MME 110 may be considered the main control node for the core network 100. Some features handled by MME 110 include: bearer activation/de-activation, idle mode UE tracking, choice of SGW for a UE 104, intra-LTE handover involving core network node location, interacting with the home location register (HLR)/home subscriber server (HSS) 130 to authenticate user on attachment, and providing temporary identities for UEs 104.

HLR/HSS 130 is a central database that contains user-related and subscription-related information. Functions of the HLR/HSS 130 may include mobility management, call and session establishment support, user authentication and access authorization.

SGW 120 is a data plane element within the core network 100. SGW 120 manages user plane mobility and acts as the main interface between the radio access network(s) and the core network. SGW 120 can also maintain the data path between the eNBs 101 and PGW 125. As a result, SGW 120 may form an interface for the data packet network at the E-UTRAN. SGW 120 may also be in communication with home public land mobile network (HPLMN) gateway 135 which may store the home user's 140 subscription data. PGW 125 provides connectivity for the UE to external packet data networks (PDNs). A UE 104 may have connectivity with more than one PGW 125 for accessing multiple PDNs 150.

A serving GPRS support node (SGSN) 105 may be provided in the core network 100 to transfer information to and from the GERAN and UTRAN via an Iu interface, for example. SGSN 105 may communicate with SGW 120 via the S4 interface. SGSN 105 may store location information for a UE, such as current cell, and may also store user profiles, such as international mobile subscriber identity (IMSI).

Figure 2:
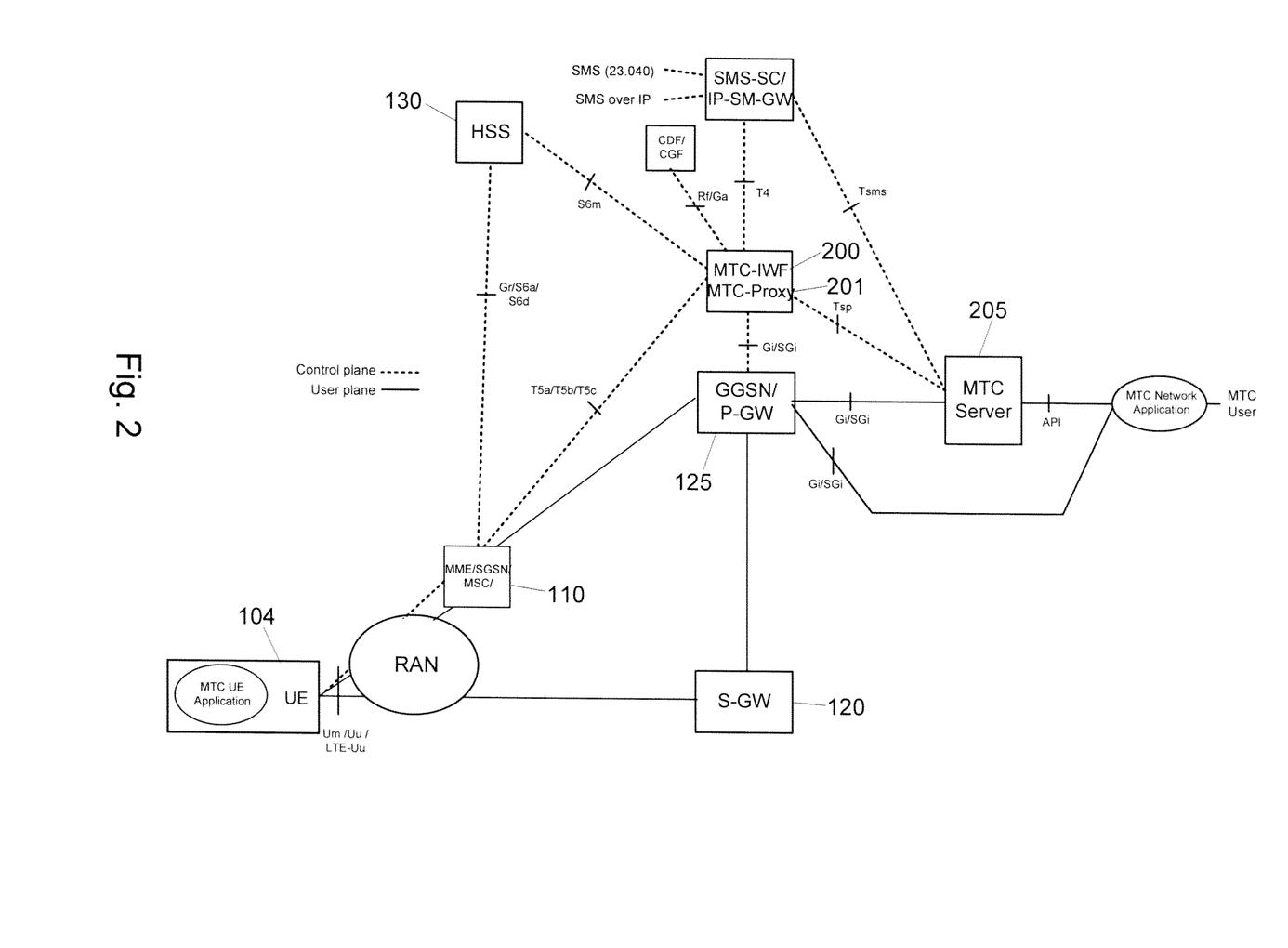
FIG. 2 illustrates a system according to another embodiment.

FIG. 2 illustrates an example of a machine-type communication (MTC) architecture, according to an embodiment. For MTC, a new functional entity called machine-type communication interworking function (MTC-IWF) 200 and some new interfaces, such as S6m, Tsp, Tsms, T5a/b/c and T4, are introduced to the 3GPP architecture as shown in FIG. 2. One purpose of the MTC-IWF 200 and the new interfaces in 3GPP release 11 is to enable triggering of devices, for instance in order to establish a packet data network (PDN) connection/packet data protocol (PDP) context, with or without a mobile station international subscriber directory number (MSISDN) from an internal or external MTC Server 205.

MSISDN-less operation, such as device triggering without MSISDN, is one of the MTC related features to be included in 3GPP release 11 (see 3GPP TS 23.682 and TR 23.888). For MSISDN-less device triggering, a new external identifier is defined in 3GPP TS 23.682 and TR 23.888. This external identifier can be, for instance, a fully qualified domain name (FQDN) or a network access identifier (NAI). The external identifier may be provided by the MTC server 205 on the Tsp interface to the MTC-IWF 200, as illustrated in FIG. 2. The MTC-IWF 200 queries the HSS 130 over the S6m interface to map the external identifier to IMSI, and then the IMSI is used on internal interfaces such as T4 and T5a/b/c.

However, the MSISDN is also to be provided by the network at external interfaces to other networks, such as corporate networks. For example, the MSISDN may be provided via the Gi/SGi interface to a corporate authentication, authorization and accounting (AAA) server (e.g., using Remote Authentication Dial In User Service (RADIUS) or Diameter) to authenticate corporate users and allocate an IP address, or via lawful interception (LI) handover interfaces to the national authorities.

Thus, simply replacing the MSISDN with the newly defined external identifier would require updates to many of the internal interfaces (HSS to MME/SGSN/MSC, SGSN to GGSN and MME to S/PGW). In addition, the external identifier may be several times larger than the MSISDN, so enhancing all these internal interfaces only for the purposes of providing the external identifier at the egress of the network (e.g., at Gi and SGi), while the IMSI is still used internally is not justified. Therefore, this necessitates the need to define a solution that does not require the external identifier to be included at every internal interface while at the same time ensures that IMSI is not exposed outside the operator domain (e.g., to the corporate AAA server).

In view of the above, embodiments of the invention define a new functional entity in the network, called a MTC-Proxy. Similar to the MTC-IWF 200 that resides at the ingress of the network, MTC-Proxy can reside at the egress of the network. In one embodiment, MTC-Proxy is configured to replace the network internally used IMSI with the external identifier. The MTC-Proxy can be a standalone entity or collocated with other network elements. According to certain embodiments, the MTC-Proxy can be used in machine-type communication or in machine-to-machine communication scenarios, but can also be used in other scenarios where no machines are involved in the communications path.

FIG. 2 illustrates an embodiment where the MTC-Proxy 201 is collocated with the MTC-IWF 200 having a Gi/SGi interface to the GGSN/PGW 125. The MTC-Proxy 201 is in the routing path of messages that contain the IMSI for which the destination is outside the network. Thus, MTC-Proxy 201 can replace the IMSI with the external identifier before the messages leave the network boundaries.

In the case of Gi/SGi, the MTC-Proxy 201 may be configured as a first hop in the GGSN/PGW 125 for special APNs, such as corporate APNs. For those APNs, the RADIUS/DIAMETER requests are finally destined for an AAA server in the external (e.g., corporate) network. In this embodiment, the MTC-Proxy 201 receives AAA requests and responses. MTC-Proxy 201 replaces the IMSI with the external identifier and vice versa before routing the request or response further on.

The destination (external) AAA server is simply configured per APN in the MTC-Proxy 201. According to one embodiment, the MTC-Proxy 201 may query the HSS 130 with the IMSI to retrieve the corresponding external identifier and store this mapping for further usage. To avoid too many queries, the MTC-Proxy 201 can request from the HSS 130 to be notified when there is a change in the mapping, for example due to operation, administration and maintenance (OA&M), for external identifier(s) stored in the MTC-Proxy. The MTC-Proxy 201 may also store the GGSN/PGW 125, i.e., originator of the request, information corresponding to the request. This may help the MTC-Proxy 201 to forward the response back to the GGSN/PGW 125 upon receiving the response from the AAA server. Alternatively, the MTC-Proxy 201 can use routing information provided in the routing headers of AAA request/response messages.

Therefore, according to one embodiment, the MTC-Proxy 201 identifies the external destination entity, such as the AAA server, for messages from an internal network entity, such as the GGSN/PGW 125. The identification of the external destination may be made based on configuration information. The MTC-Proxy 201 may then replace the IMSI within the request message with the external identifier, as outlined above. Then, according to an embodiment, the MTC-Proxy 201 may receive a response from the external entity and replace the external identifier within the response message with the corresponding IMSI. The MTC-Proxy 201 can then forward the response to the appropriate internal network entity, such as the GGSN/PGW 125.

The MTC-Proxy 201 can also be used as a proxy for other interfaces and messages. It is not limited to work as a RADIUS/DIAMETER proxy on the Gi/SGi interface. It can also serve as a proxy for the LI handover interfaces, for example.

If the MTC-Proxy 201 is collocated with the MTC-IWF 200, the MTC-IWF 200 may need to query the HSS 130 when it receives an incoming device trigger request via the Tsp interface. In this embodiment, the MTC-IWF 200 stores the IMSI/external identifier mapping. If the device trigger request leads to the establishment of a PDN/PDP connection and GGSN/PGW 125 sends an AAA request via the Gi/SGi to the MTC-Proxy 201, the proxy 201 as collocated with the MTC-IWF 200 already knows the IMSI/external identifier mapping and can easily replace the IMSI by the external identifier before routing the request further on.

The MTC-Proxy 201 can be collocated with any other core network element, can be standalone, or can be collocated with the MTC-IWF as discussed above. Some advantages of the MTC-Proxy is that there is no need to enhance internal interfaces with the new, and probably large, external identifier as the mapping between IMSI and the external identifier is done centrally at the egress of the network. If the MTC-Proxy is collocated with the MTC-IWF, then there is only one central point in the network to map IMSI to/from external identifier at the egress and ingress of the network.

Figure 3:
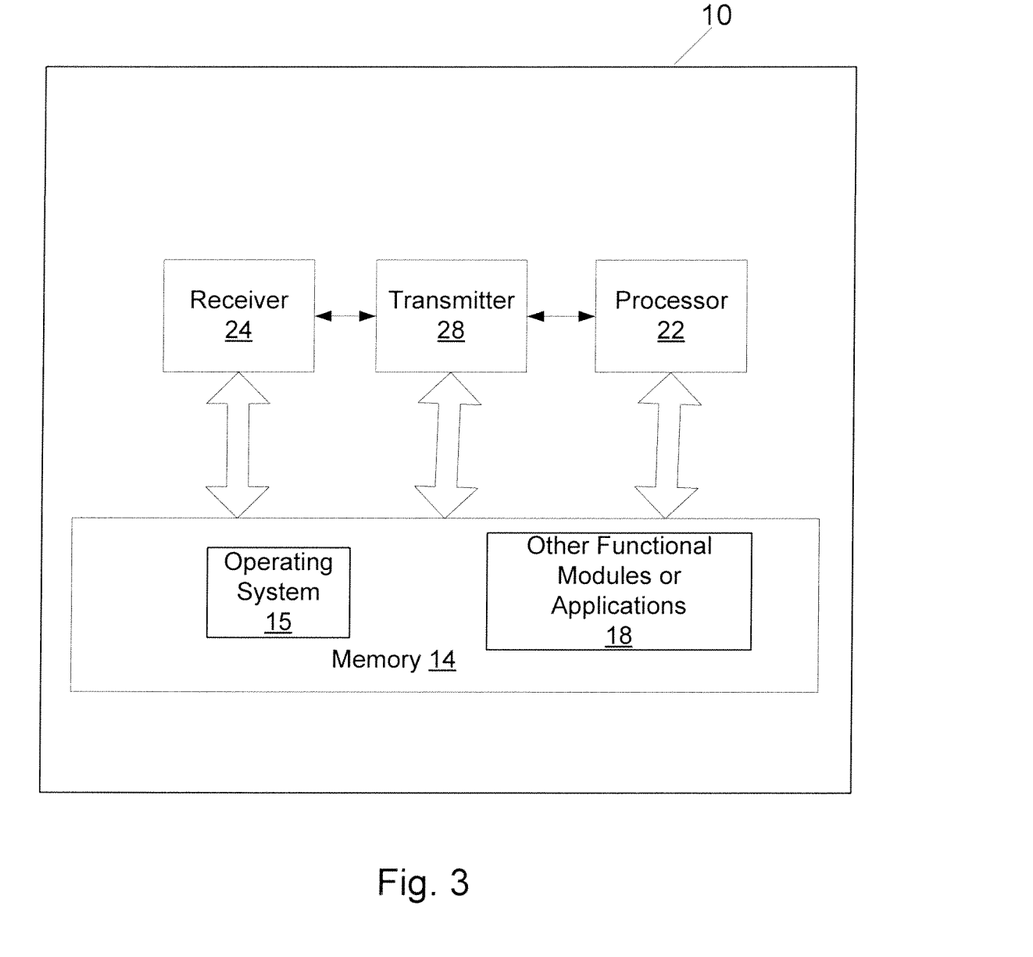
FIG. 3 illustrates an apparatus according to one embodiment.

FIG. 3 illustrates an apparatus 10 according to one embodiment. In an embodiment, apparatus 10 may be the MTC-Proxy 201 illustrated in FIG. 2. Apparatus 10 includes a processor 22 for processing information and executing instructions or operations. Processor 22 may be any type of general or specific purpose processor. While a single processor 22 is shown in FIG. 3, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may further include a transmitter 28 for transmitting information, such as data and/or control signals. Apparatus 10 may also include a receiver 24 for receiving information including data and/or control signals. In some examples, the receiver and transmitter functionality may be implemented in a single transceiver unit.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

In one embodiment, memory 14 and the computer program code stored thereon may be configured, with processor 22, to cause the apparatus 10 to receive a request including an IMSI for which the destination is outside the network. Apparatus 10 may then be controlled to replace the IMSI with an external identifier before further routing the request. According to an embodiment, apparatus 10 may query a HSS with the IMSI to retrieve the corresponding external identifier. After retrieving the corresponding external identifier, apparatus 10 may store a mapping of the IMSI to the corresponding external identifier for future use. In some embodiments, the request received by apparatus 10 is a device trigger request. In another embodiment, the external identifier may be provided by a MTC server. According to some embodiments, apparatus 10 is configured to identify the external destination entity and to forward the request with the external identifier to the identified destination entity.

According to an embodiment, apparatus 10 may be further controlled to receive a response from the entity external to the network. The response may include the external identifier. In an embodiment, apparatus 10 may be controlled to replace the external identifier from the response with the corresponding IMSI. Apparatus 10 can then be controlled to forward the response to the appropriate internal network entity.

Figure 4:
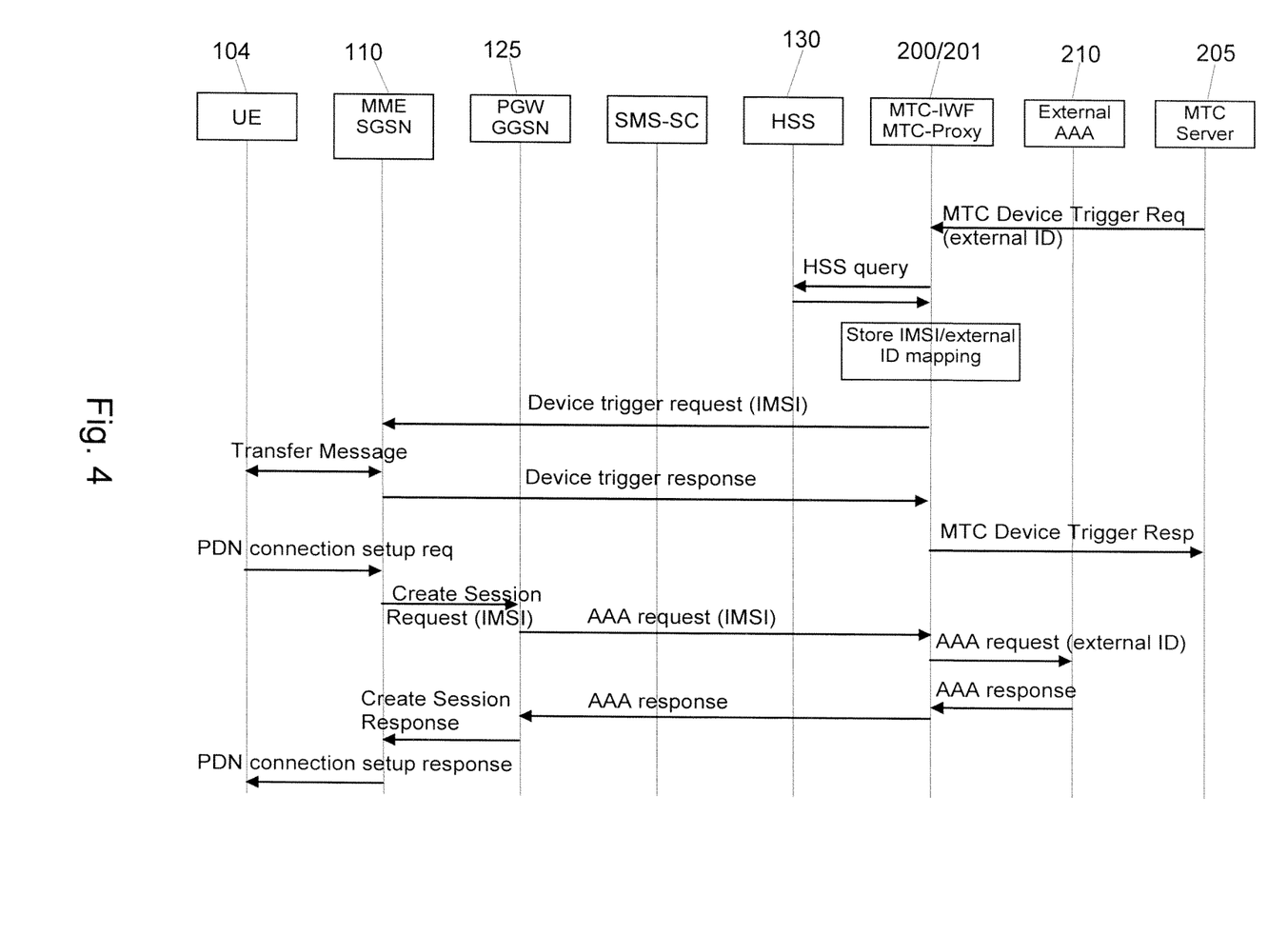
FIG. 4 illustrates a signaling diagram according to one embodiment.

FIG. 4 illustrates a call flow or signaling diagram according to an embodiment with the assumption that the MTC-Proxy 201 is collocated with the MTC-IWF 200. As shown in FIG. 4, MTC server 205 may send a MTC device trigger request to the MTC-IWF 200. MTC-IWF 200 queries HSS 130 to retrieve the IMSI/external identifier mapping. MTC-IWF 200 may then store the mapping. When the GGSN/PGW 125 sends a request destined for an external entity (AAA request), MTC-Proxy 201 replaces the IMSI in the request with the appropriate external identifier from the stored mapping. MTC-Proxy 201 then forwards the request with the external identifier to the external AAA server 210. MTC-Proxy 201 may then receive a response (AAA response) from the external AAA server 210. MTC-Proxy 201 can replace the external identifier in the response with the appropriate IMSI and forward the response back to the GGSN/PGW 125.

Figure 5:
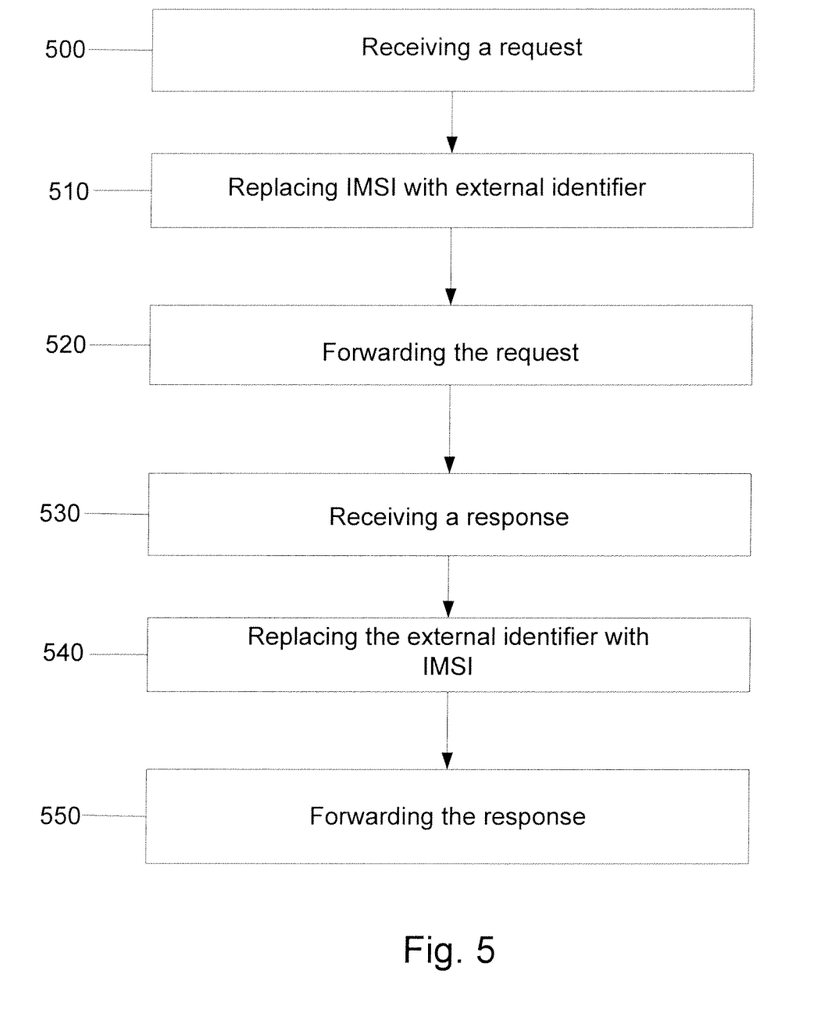
FIG. 5 illustrates a flow diagram of a method according to one embodiment.

FIG. 5 illustrates a flow diagram of a method according to one embodiment. In some embodiments, the method of FIG. 5 may be performed by apparatus 10 discussed above. The method includes, at 500, receiving a request including an IMSI for which the destination is outside the network. At 510, the method includes replacing the IMSI with an external identifier before further routing the request. In one embodiment, the external identifier may be retrieved from a HSS. After replacing the IMSI with the external identifier, the method includes, at 520, forwarding the request with the external identifier to the destination entity. At 530, the method includes receiving a response from the destination entity, where the response may include an external identifier. The method may then include, at 540, replacing the external identifier from the response with the corresponding IMSI. At 550, the method includes forwarding the response with the IMSI to the appropriate internal network entity.

In some embodiments, the functionality of the flow diagram of FIG. 5, or that of any other method described herein, may be implemented by a software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

The computer readable media mentioned above may be at least partially embodied by a transmission line, a compact disk, digital-video disk, a magnetic disk, holographic disk or tape, flash memory, magnetoresistive memory, integrated circuits, or any other digital processing apparatus memory device.

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Further, embodiments may be combined, performed in combination or implemented together. In order to determine the metes and bounds of the invention, therefore, reference should be made to the appended claims.

We claim:

1. A method, comprising:
   receiving a request at a machine-type communication proxy residing at an egress of a network, the request comprising an international mobile subscriber identity for which a destination is outside the network;
   before routing the request outside the network, replacing, by the machine-type communication proxy, the international mobile subscriber identity in the request with an external identifier, wherein the external identifier is different from a Mobile Station International Subscriber Directory Number (MSISDN);
   querying a home subscriber server with the international mobile subscriber identity to retrieve the corresponding external identifier; and
   storing, in a memory of the machine-type communication proxy, a mapping of the international mobile subscriber identity to the corresponding external identifier.

2. The method according to claim 1, further comprising forwarding the request to an external network element.

3. The method according to claim 2, further comprising:
   receiving a response from the external network element, the response comprising the external identifier;
   replacing the external identifier with the corresponding international mobile subscriber identity; and
   forwarding the response to an internal network element.

4. The method according to claim 1, wherein the receiving comprises receiving a device trigger request.

5. The method according to claim 3, further comprising storing internal network element information corresponding to the request to assist in the forwarding of the response to the internal network element.

6. The method according to claim 3, further comprising using routing information in a routing header of the request to forward the response to the internal network element.

7. An apparatus, comprising:
   at least one processor; and
   at least one memory including computer program code,
   the at least one memory and the computer program code configured, with the at least one processor, to cause the apparatus at least to
   receive a request at an egress of a network, the request comprising an international mobile subscriber identity for which a destination is outside the network;
   before routing the request outside the network, replace the international mobile subscriber identity in the request with an external identifier, wherein the external identifier is different from a Mobile Station International Subscriber Directory Number (MSISDN);
   query a home subscriber server with the international mobile subscriber identity to retrieve the corresponding external identifier; and
   store, in the at least one memory of the apparatus, a mapping of the international mobile subscriber identity to the corresponding external identifier.

8. The apparatus according to claim 7, wherein the at least one memory and the computer program code are further configured, with the at least one processor, to cause the apparatus at least to forward the request to an external network element.

9. The apparatus according to claim 8, wherein the at least one memory and the computer program code are further configured, with the at least one processor, to cause the apparatus at least to:
   receive a response from the external network element, the response comprising the external identifier;
   replace the external identifier with the corresponding international mobile subscriber identity; and
   forward the response to an internal network element.

10. A computer program embodied on a non-transitory computer readable medium, the computer program configured to control a processor to perform a process, the process comprising:
    receiving, by a machine-type communication proxy residing at an egress of a network, a request comprising an international mobile subscriber identity for which a destination is outside the network;
    before routing the request outside the network, replacing the international mobile subscriber identity in the request with an external identifier, wherein the external identifier is different from a Mobile Station International Subscriber Directory Number (MSISDN);
    querying a home subscriber server with the international mobile subscriber identity to retrieve the corresponding external identifier; and
    storing, in a memory of the machine-type communication proxy, a mapping of the international mobile subscriber identity to the corresponding external identifier.

11. The computer program according to claim 10, further comprising forwarding the request to an external network element.

12. The computer program according to claim 11, further comprising:
    receiving a response from the external network element, the response comprising the external identifier;
    replacing the external identifier with the corresponding international mobile subscriber identity; and
    forwarding the response to an internal network element.

* * * * *